(12) United States Patent
Kakimi et al.

(10) Patent No.: US 9,214,792 B2
(45) Date of Patent: Dec. 15, 2015

(54) ELECTRICAL JUNCTION BOX

(71) Applicant: Yazaki Corporation, Tokyo (JP)

(72) Inventors: Takaaki Kakimi, Makinohara (JP); Sunsoku I, Makinohara (JP); Yasutomo Kubo, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/277,333

(22) Filed: May 14, 2014

(65) Prior Publication Data
US 2014/0338949 A1 Nov. 20, 2014

(30) Foreign Application Priority Data
May 20, 2013 (JP) .................. 2013-106245

(51) Int. Cl.
H02G 3/08 (2006.01)

(52) U.S. Cl.
CPC ..................... H02G 3/088 (2013.01)

(58) Field of Classification Search
CPC .................. H02G 3/18; H02G 3/088
USPC ........................................... 174/50
See application file for complete search history.

(56) References Cited

U.S. PATENT DOCUMENTS

| 5,925,851 A | 7/1999 | Sugahara |
| 6,911,600 B2 * | 6/2005 | Kiyota et al. ................. 174/668 |
| 2012/0222880 A1 | 9/2012 | Dinh |

FOREIGN PATENT DOCUMENTS

| DE | 10 2004 032 481 A1 | 1/2005 |
| DE | 10 2006 039 648 B3 | 3/2008 |
| FR | 1 098 936 A | 8/1955 |
| JP | 2010-093882 A | 4/2010 |

OTHER PUBLICATIONS

Search Report dated Nov. 27, 2014, issued for the French patent application No. 1454438 and English translation thereof.

* cited by examiner

*Primary Examiner* — Dhirubhai R Patel
(74) *Attorney, Agent, or Firm* — Locke Lord LLP

(57) ABSTRACT

A harness outlet through which a wiring harness is passed is provided on a sidewall of a case of an electrical junction box. A harness guide is extended form a circumference of the harness outlet to protect the wiring harness and to regulate a path (outlet direction) of the wiring harness. At a side near the harness outlet, the harness guide covers a whole circumference of the wiring harness. At a side away from the harness outlet, the harness guide covers both sides and an upper portion of the wiring harness, and a portion for covering the lower portion of the wiring harness is not provided on the harness guide.

4 Claims, 9 Drawing Sheets

ELECTRICAL JUNCTION BOX

CROSS REFERENCE TO RELATED APPLICATIONS

This application is on the basis of Japanese Patent Application No. 2013-106245, the contents of which are hereby incorporated by reference.

TECHNICAL FIELD

The present invention relates to an on-vehicle electrical junction box.

BACKGROUND ART

An on-vehicle electrical junction box has various structures. For example, there is a structure shown in FIGS. 10 and 11 (for example, see PTL 1).

An electrical junction box 301 shown in FIGS. 10 and 11 includes: a plurality of electronic components (not shown) such as a relay, a fuse, and a bus bar; and a case 311 for housing these electronic components. The case 311 is composed of: a case main body 312; a lower cover 313 for covering a lower end of the case main body 312; and an upper cover (not shown) for covering an upper end of the case main body 312.

A harness outlet 303 through which a wiring harness 302 is passed is provided on a sidewall of the case 311. The harness outlet port 303 is composed of: a notch formed on an upper end of an outer wall of the lower cover 313; and a lower end of an outer wall of the case main body 312. The harness outlet 303 is made by assembling the lower cover 313 to the case main body 312.

A harness guide 304 is extended from a circumference of the harness outlet 303. The harness guide 304 is formed in a tubular shape, and protects the wiring harness 302 and regulates a path (outlet direction) of the wiring harness 302 by positioning the wiring harness 302 thereinside. Further, the harness guide 304 is composed of a gutter-shaped upper divided portion 341 integrally formed with the case main body 312; and a gutter-shaped lower divided portion 342 integrally formed with the lower cover 313.

CITATION LIST

Patent Literature

PTL 1: JP, A, 2010-093882

SUMMARY OF INVENTION

Technical Problem

However, in the conventional electrical junction box 301 described above, when the high pressure cleaning water or the like is splashed, as shown by an arrow H in FIG. 11, there is a problem that the water enters from a gap between the harness guide 304 and the wiring harness 302 to an inside of the case 311. Incidentally, as shown by the arrow H, the water hits a lower portion of the wiring harness 302 and rebounds to a lower surface of the harness guide 304. By repeating this, the water enters the inside of the case 311.

Further, in the electrical junction box 301, it becomes hard for the water to enter when a side away from the harness outlet 303 of the harness guide 304 is inclined downward. However, it is hard to prevent the water from entering completely.

Further, when the wiring harness is only guided out horizontally due to some limitation, the harness guide cannot be inclined downward as described above.

Accordingly, an object of the present invention is to provide an electrical junction box able to prevent the water from entering an inside of a case via a harness guide.

Solution to Problem

For attaining the object, according to a first aspect of the present invention, there is provided an electrical junction box including:
a case for housing electronic components;
a harness outlet provided on a sidewall of the case; and
a harness guide extended from a circumference of the harness outlet,
wherein at a side near the harness outlet, the harness guide covers a whole circumference of a wiring harness and at a side away from the harness guide, the harness guide covers both sides and an upper portion of the wiring harness and a portion for covering a lower portion of the wiring harness is not provided on the harness guide.

According to a second aspect of the present invention, there is provided the electrical junction box as described in the first aspect,
wherein at least the side away from the harness outlet of the harness guide is inclined downward.

According to a third aspect of the present invention, there is provided the electrical junction box as described in the first or second aspect,
wherein a portion of the harness guide which does not cover the lower portion of the wiring harness at the side away from the harness outlet is half or more of a whole length of the harness guide.

Advantageous Effects of Invention

According to the invention described in the first aspect, at a side near the harness outlet, the harness guide covers a whole circumference of a wiring harness and at a side away from the harness guide, the harness guide covers both sides and an upper portion of the wiring harness and a portion for covering a lower portion of the wiring harness is not provided on the harness guide. Therefore, the harness guide can protect the wiring harness, regulate a path (outlet direction) of the wiring harness, and provide an electrical junction box able to prevent the water from entering an inside of the case via the harness guide.

According to the invention described in the second aspect, because at least the side away from the harness outlet of the harness guide is inclined downward, the water is further prevented from entering the inside of the case via the harness guide.

According to the invention described in the third aspect, a portion of the harness guide which does not cover the lower portion of the wiring harness at the side away from the harness outlet is half or more of a whole length of the harness guide. Therefore, the water is still further prevented from entering the inside of the case via the harness guide.

These and other objects, features, and advantages of the present invention will become more apparent upon reading of the following detailed description along with the accompanied drawings.

DESCRIPTION OF EMBODIMENTS

First Embodiment

An electrical junction box according to a first embodiment of the present invention will be explained with reference to FIGS. 1 to 3.

Figure 1:
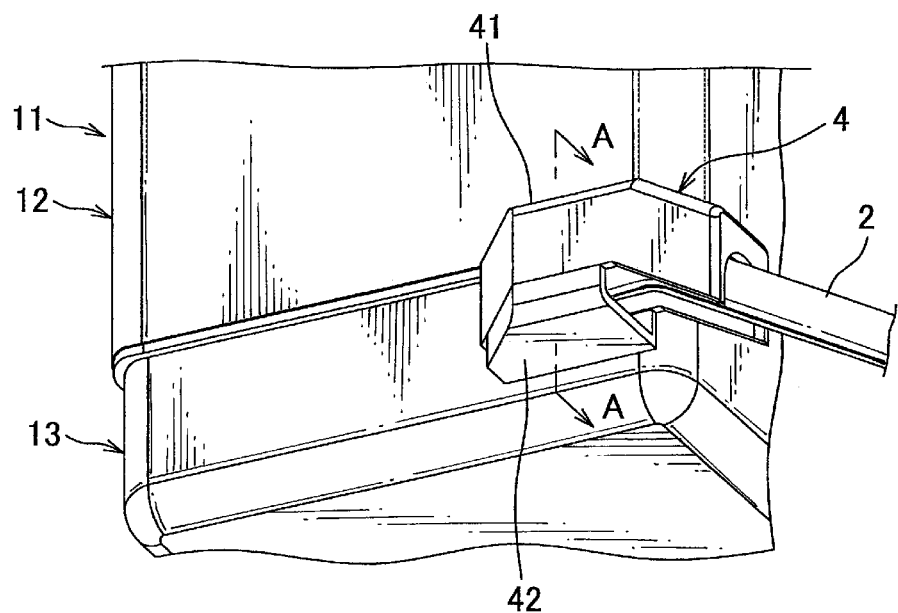
FIG. 1 is a perspective view showing an electrical junction box according to a first embodiment of the present invention.
Figure 2:
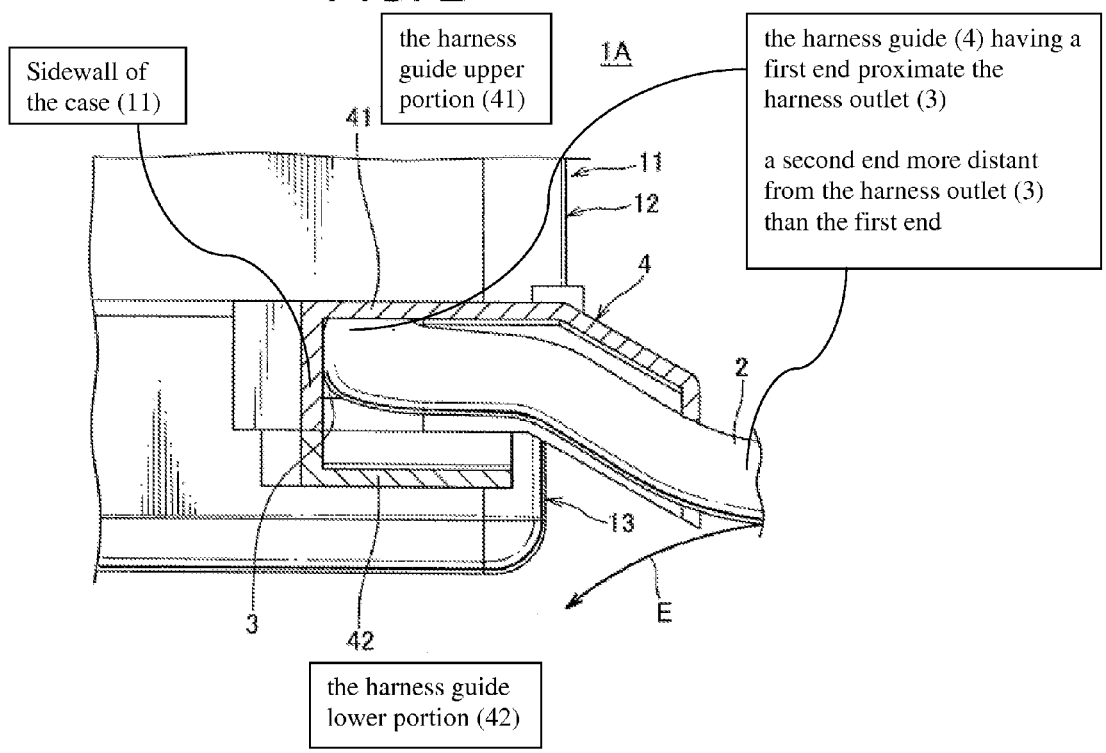
FIG. 2 is a sectional view taken on line A-A of FIG. 1.
Figure 3:
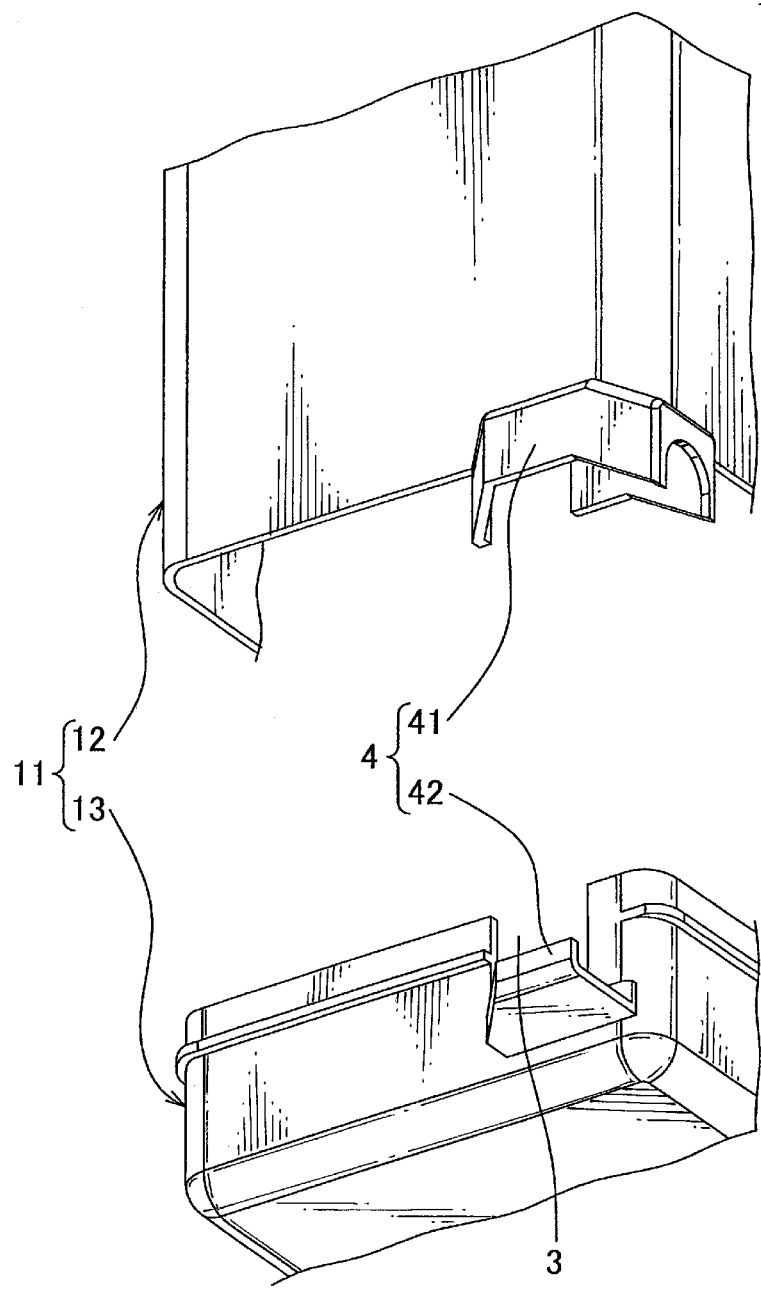
FIG. 3 is an exploded view of the electrical junction box shown in FIG. 1.

An electrical junction box 1A shown in FIGS. 1 to 3 is mounted on a vehicle to mainly supply an electric source. The electrical junction box 1A includes: a plurality of electronic components (not shown) such as a relay, a fuse, and a bus bar; and a case 11 housing these electronic components. The case 11 is composed of: a case main body 12 made of synthetic resin; a lower cover 13 made of synthetic resin for covering a lower end of the case main body 12; and an upper cover (not shown) made of synthetic resin for covering an upper end of the case main body 12.

As shown in FIG. 2, a harness outlet 3 through which a wiring harness 2 is passed is provided on a sidewall (namely, a vertical wall) of the case 11. As shown in FIG. 3, the harness outlet 3 is composed of a notch formed at an upper end of an outer wall of the lower cover 13 and a lower end of an outer wall of the case main body 12. When the lower cover 13 is assembled to the case main body 12, the harness outlet 3 is constructed.

The wiring harness 2 is made by bundling a plurality of electric wires. The electric wires are respectively electrically connected to the electronic components in the case 11. Incidentally, the total number of the electric wires of the wiring harness 2 is varied depending on a type or a grade of a vehicle.

A harness guide 4 is extended form a circumference of the harness outlet 3. The harness guide 4 is composed of a gutter-shaped upper divided portion 41 integrally formed with the case main body 12; and a gutter-shaped lower divided portion 42 integrally formed with the lower cover 13. A length from the harness outlet 3 of the lower divided portion 42 is shorter than a length from the harness outlet 3 of the upper divided portion 41. Accordingly, the harness guide 4 covers a whole circumference of the wiring harness 2 at a side near the harness outlet 3, and covers both sides and an upper portion of the wiring harness 2 and does not cover a lower portion of the wiring harness 2 at a side away from the harness guide 3. Namely, a portion for covering the lower portion of the wiring harness 2 (the lower divided portion 42) is not provided at the side away from the harness outlet 3 of the harness guide 4.

Further, a portion of the harness guide 4 which does not cover the lower portion of the wiring harness 2 at the side away from the harness outlet 3 is half or more of a whole length of the harness guide 4.

Further, the side near the harness outlet 3 of the harness guide 4 is extended horizontally, and the side away from the harness outlet 3 of the harness guide 4 is inclined downward.

When the wiring harness 2 is positioned in an inside of the harness guide 4, such a harness guide 4 protects the wiring harness 2 and regulates a path (outlet direction) of the wiring harness 2. Further, as described above, a portion for covering the lower portion of the wiring harness 2, namely, the lower divided portion 42 is not provided at the side away from the harness outlet 3 of the harness guide 4. However, as shown in FIG. 2, because a sidewall of the upper divided portion 41 is extended lower than the lower portion of the wiring harness 2, the wiring harness 2 can also be protected sufficiently at this position.

The above-described electrical junction box 1A can prevent the water from entering an inside of the harness guide 4 and an inside of the case 11 when the high pressure cleaning water or the like is splashed. Namely, because a portion for covering the lower portion of the wiring harness 2 is not provided at the side away from the harness outlet 3 of the harness guide 4, when the water is splashed as shown by an arrow E in FIG. 2, the water does not rebound to the wiring harness 2 side, namely, upward, and falls down by its own weight. Further, because the side away from the harness outlet 3 of the harness guide 4 is inclined downward, and the wiring harness 2 disposed thereinside is also inclined downward along a shape of the harness guide 4, it is hard for the water sticking to the wiring harness 2 by surface tension to be moved toward the harness outlet 3.

Further, in order to surely prevent the water from entering while with the harness guide 4 while the harness guide 4 protects the wiring harness 2 and regulates the path of the wiring harness effectively, it is preferable that a portion of the harness guide 4 which does not cover the lower portion of the wiring harness 2 at the side away from the harness outlet 4 is half or more of a whole length of the harness guide 4.

Second Embodiment

An electrical junction box according to a second embodiment of the present invention will be explained with reference to FIGS. 4 to 6. Further, in FIGS. 4 to 6, the same components as the first embodiment are denoted by the same reference signs, and the explanations thereof are omitted.

Figure 4:
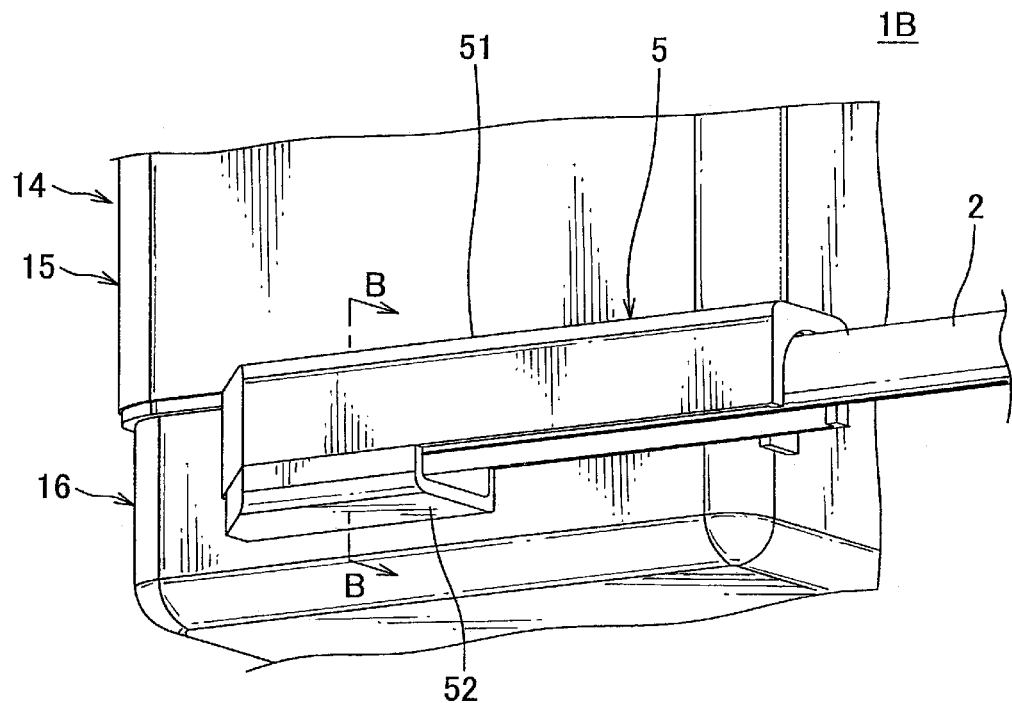
FIG. 4 is a perspective view showing an electrical junction box according to a second embodiment of the present invention.
Figure 5:
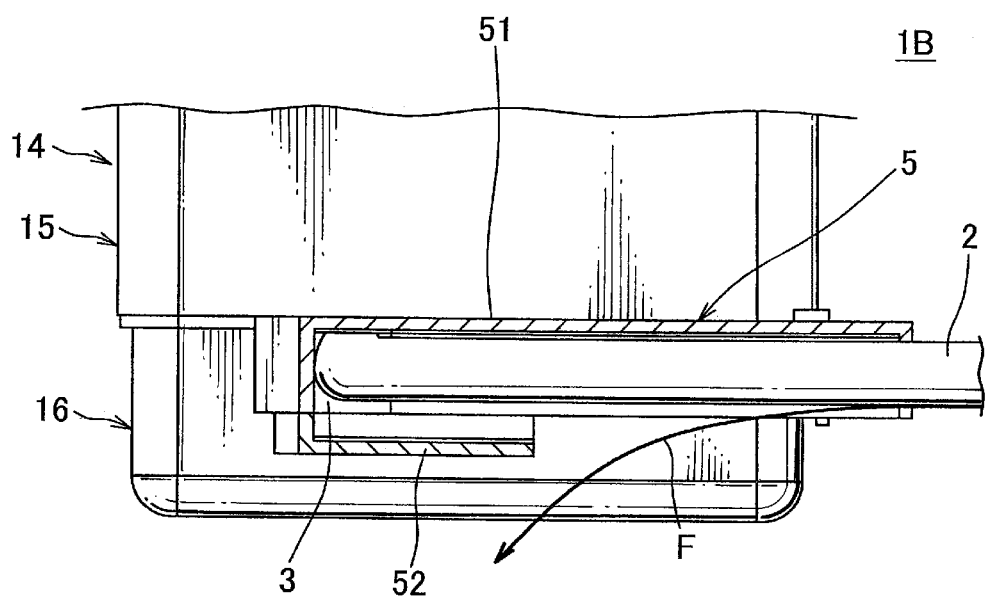
FIG. 5 is a sectional view taken on line B-B of FIG. 4.
Figure 6:
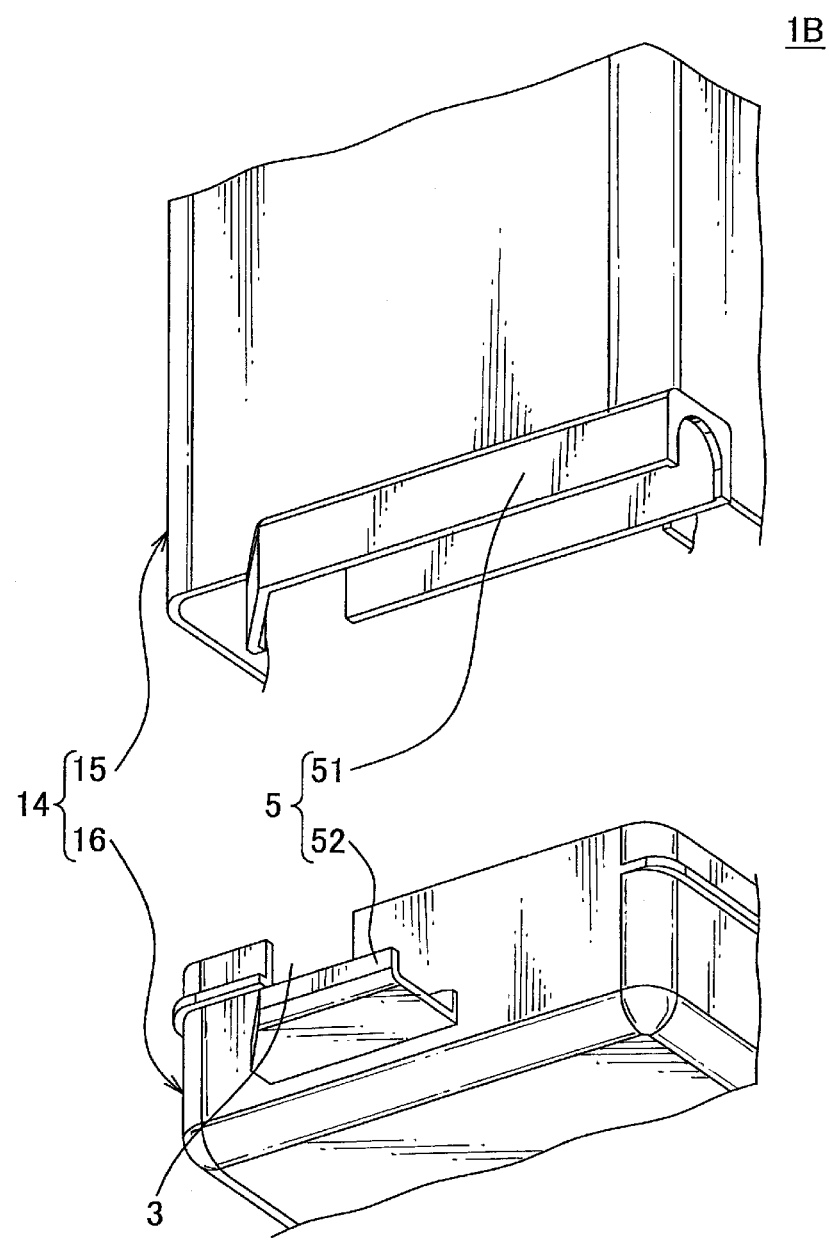
FIG. 6 is an exploded view of the electrical junction box shown in FIG. 4.

Similar to the electrical junction box 1A of the first embodiment, an electrical junction box 1B shown in FIGS. 4 to 6 includes a case 14 composed of: a case main body 15 made of synthetic resin; a lower cover 16 made of synthetic resin for covering a lower end of the case main body 15; and an upper cover (not shown) made of synthetic resin for covering an upper end of the case main body 15.

As shown in FIG. 5, a harness outlet 3 through which a wiring harness 2 is passed is provided on a sidewall (namely, a vertical wall) of the case 14. As shown in FIG. 6, the harness outlet 3 is composed of a notch formed at an upper end of an outer wall of the lower cover 16 and a lower end of an outer wall of the case main body 15. When the lower cover 16 is assembled to the case main body 15, the harness outlet 3 is constructed.

A harness guide 5 is extended form a circumference of the harness outlet 3. The harness guide 5 is composed of: a gutter-shaped upper divided portion 51 integrally formed with the case main body 15; and a gutter-shaped lower divided portion 52 integrally formed with the lower cover 16. Similar to the harness guide 4 of the first embodiment, the harness guide 4 covers a whole circumference of the wiring harness 2 at a side near the harness outlet 3, and a portion for covering the lower portion of the wiring harness 2 (the lower divided portion 52) is not provided at the side away from the harness outlet 3 of the harness guide 5.

Further, a portion of the harness guide 5 which does not cover the lower portion of the wiring harness 2 at the side away from the harness outlet 3 is half or more of a whole length of the harness guide 5.

Further, the harness guide 5 is extended horizontally over a whole area till the side away from the harness outlet 3. In this electrical junction box 1B, an attaching position to a vehicle is limited so that the wiring harness 2 is only guided out horizontally.

In the above-described electrical junction box 1B, because a portion for covering the lower portion of the wiring harness 2 is not provided at the side away from the harness outlet 3 of the harness guide 5, when the high pressure cleaning water is splashed as shown by an arrow F in FIG. 5, the water does not rebound to the wiring harness 2 side, namely, upward, and falls down by its own weight. Therefore, the water is prevented from entering an inside of the harness guide 5 and an inside of the case 14.

Third Embodiment

An electrical junction box according to a third embodiment of the present invention will be explained with reference to FIGS. 7 to 9. Further, in FIGS. 7 to 9, the same components as the first and second embodiments are denoted by the same reference signs, and the explanations thereof are omitted.

Figure 7:
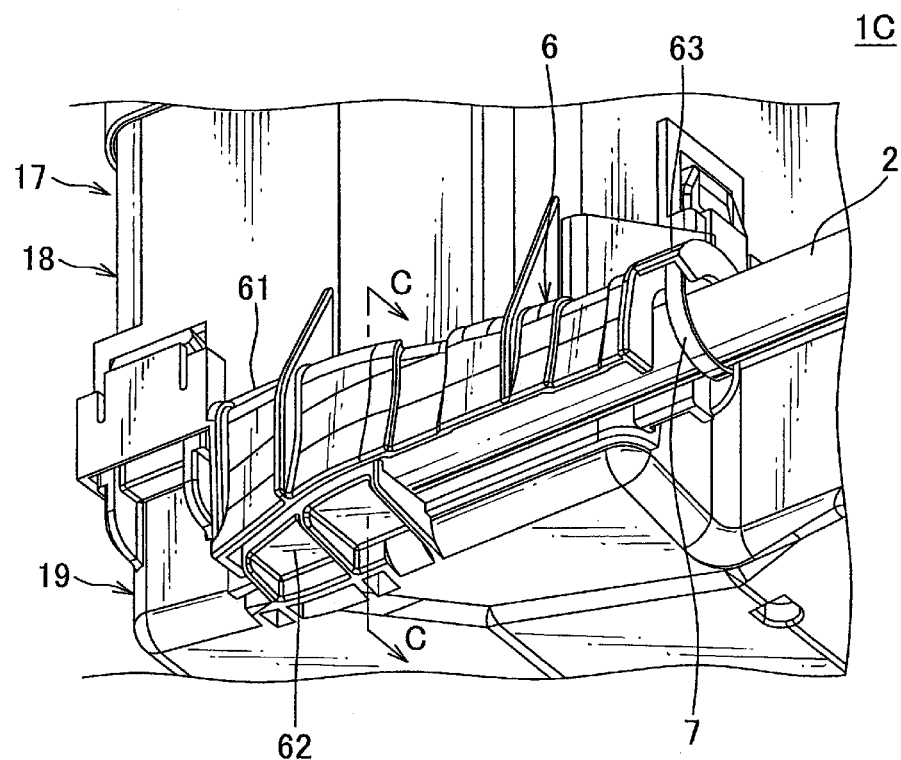
FIG. 7 is a perspective view showing an electrical junction box according to a third embodiment of the present invention.
Figure 8:
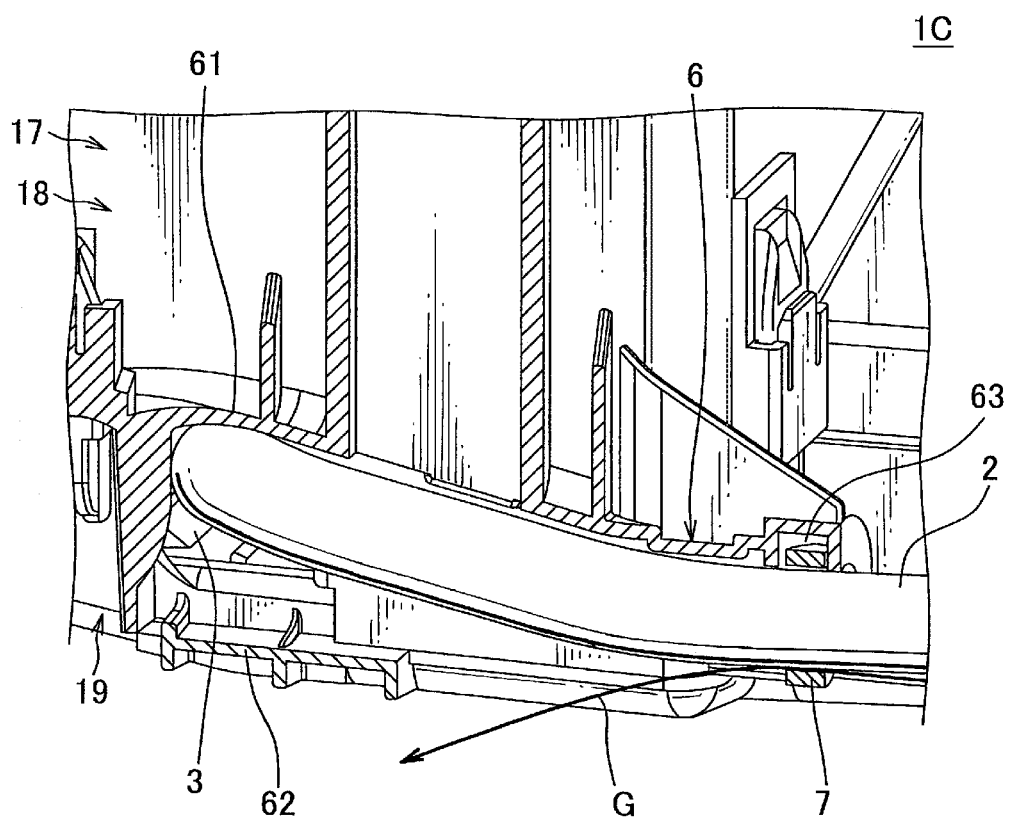
FIG. 8 is a sectional view taken on line C-C of FIG. 7.
Figure 9:
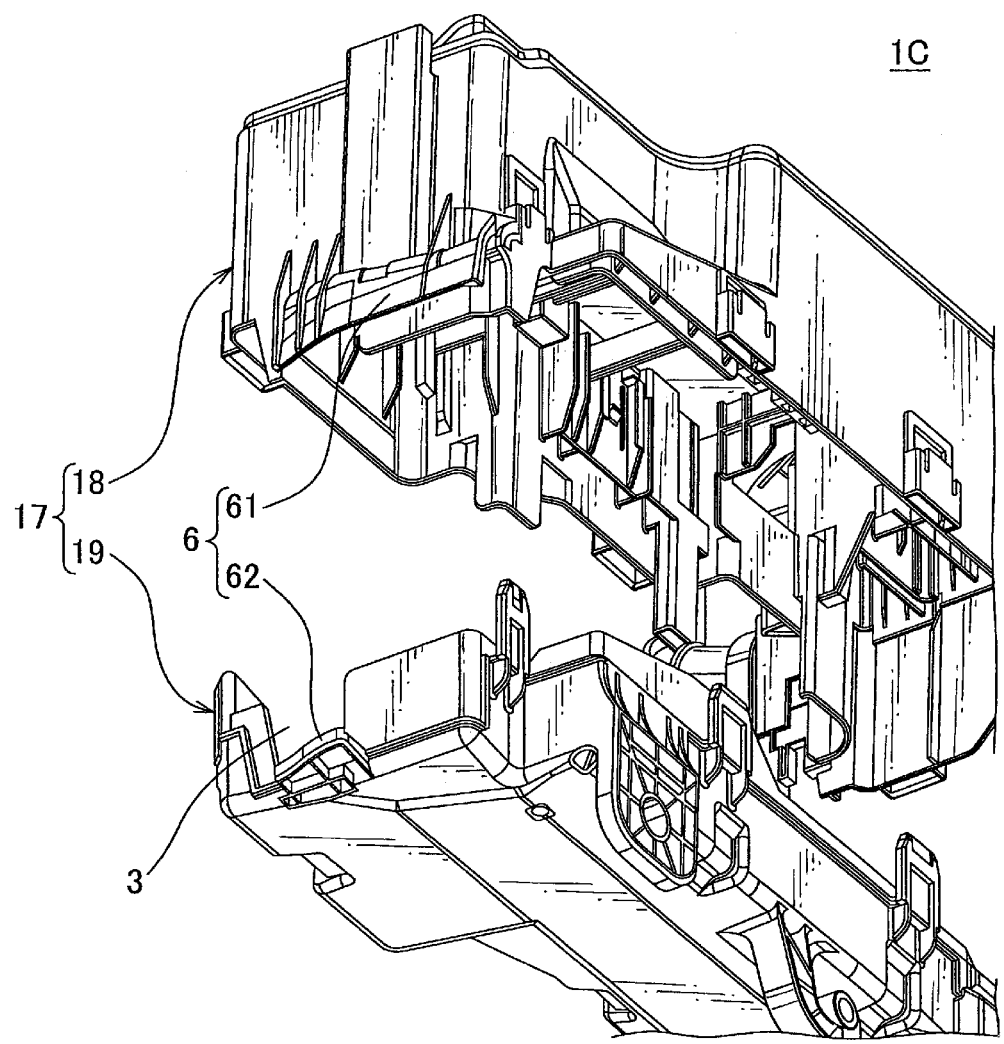
FIG. 9 is an exploded view of the electrical junction box shown in FIG. 7.
Figure 10:
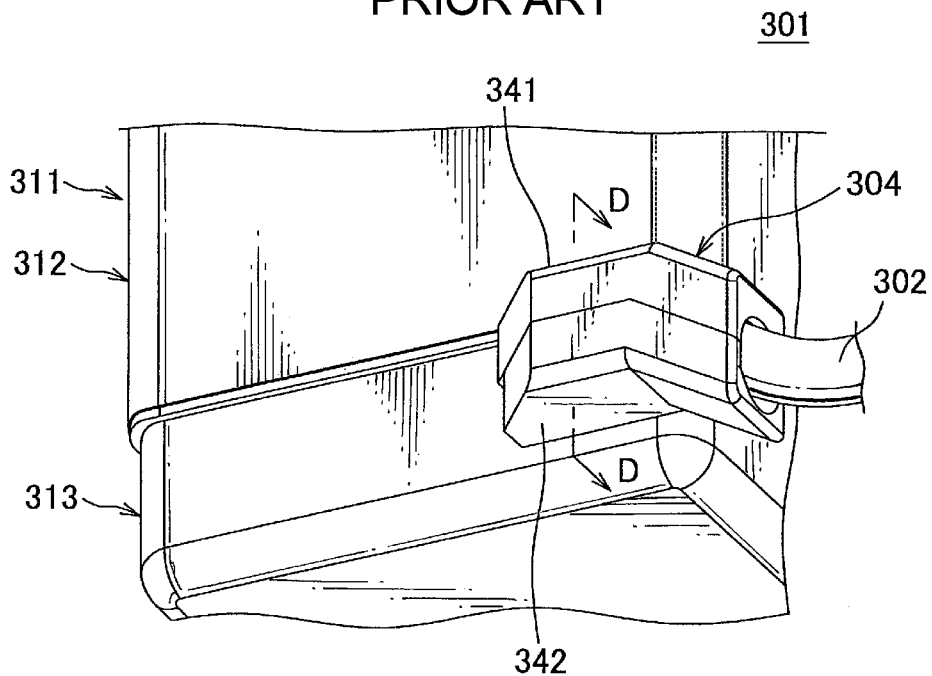
FIG. 10 is a perspective view showing a conventional electrical junction box.
Figure 11:
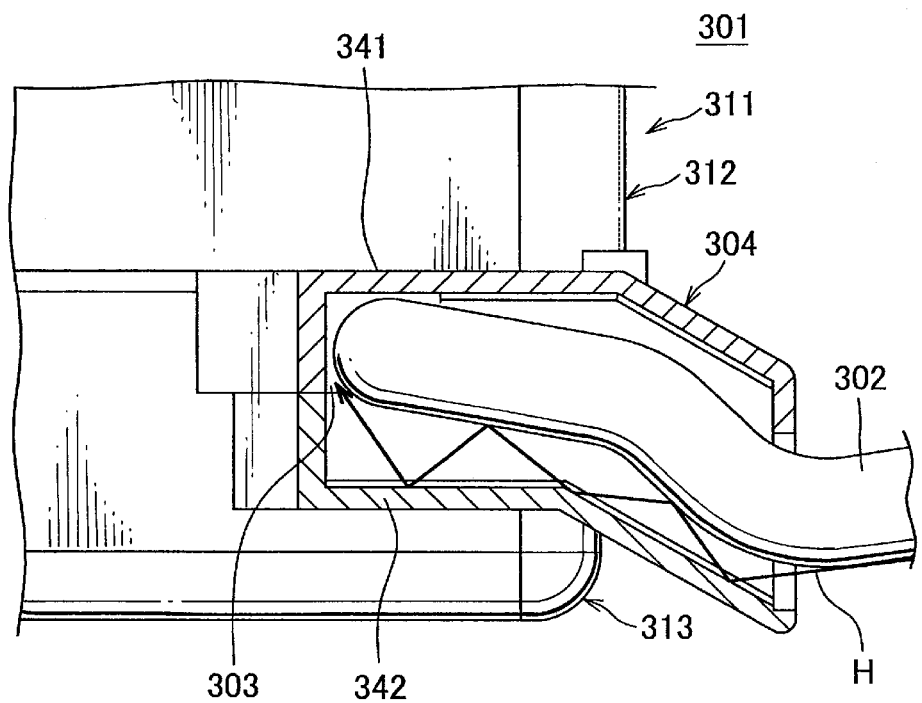
FIG. 11 is a sectional view taken on line DD of FIG. 10.

Similar to the electrical junction boxes 1A, 1B of the first and second embodiments, an electrical junction box 1C shown in FIGS. 7 to 9 includes a case 17 composed of: a case main body 18 made of synthetic resin; a lower cover 19 made of synthetic resin for covering a lower end of the case main body 18; and an upper cover (not shown) made of synthetic resin for covering an upper end of the case main body 18.

As shown in FIG. 8, a harness outlet 3 through which a wiring harness 2 is passed is provided on a sidewall (namely, a vertical wall) of the case 17. As shown in FIG. 9, the harness outlet 3 is composed of a notch formed on an outer wall of the lower cover 19 and a lower end of an outer wall of the case main body 18. When the lower cover 19 is assembled to the case main body 18, the harness outlet 3 is constructed.

A harness guide 6 is extended form a circumference of the harness outlet 3. The harness guide 6 is composed of: a gutter-shaped upper divided portion 61 integrally formed with the case main body 18; and a gutter-shaped lower divided portion 62 integrally formed with the lower cover 19. Similar to the harness guides 4, 5 of the first and second embodiments, the harness guide 6 covers a whole circumference of the wiring harness 2 at a side near the harness outlet 3, and a portion for covering the lower portion of the wiring harness 2 (the lower divided portion 62) is not provided at the side away from the harness outlet 3 of the harness guide 6.

Further, a portion of the harness guide 6 which does not cover the lower portion of the wiring harness 2 at the side away from the harness outlet 3 is half or more of a whole length of the harness guide 6.

Further, the harness guide 6 is extended substantially horizontally over a whole area till the side away from the harness outlet 3. In this electrical junction box 1C, the harness guide 3 is provided on a lowest portion of a sidewall of the case 17, and the wiring harness 2 is only guided out substantially horizontally.

Further, a binding band insertion hole 63 allowing a binding band 7 to be inserted thereinto is provided at a tip away from the harness outlet 3 of the harness guide 6. The wiring harness 2 is fixed to the harness guide 6 with the binding band 7 inserted into the binding band insertion hole 63.

In the above-described electrical junction box 1C, because a portion for covering the lower portion of the wiring harness 2 is not provided at the side away from the harness outlet 3 of the harness guide 6, when the high pressure cleaning water is splashed as shown by an arrow G in FIG. 8, the water does not rebound to the wiring harness 2 side, namely, upward, and falls down by its own weight. Therefore, the water is prevented from entering an inside of the harness guide 6 and an inside of the case 17.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

REFERENCE SIGNS LIST 1A, 1B, 1C electrical junction box
2 wiring harness
3 harness outlet
4, 5, 6 harness guide
11, 14, 17 case

What is claimed is:

1. An electrical junction box comprising:
a case for housing electronic components;
a harness outlet provided on a sidewall of the case; and
a harness guide extended from a circumference of the harness outlet, the harness guide having a first end proximate the harness outlet, and a second end more distant from the harness outlet than the first end,
wherein the wiring harness having first and second lateral side portions, an upper portion and a lower portion, at the first end the harness guide covers a whole circumference of a wiring harness, and at the second end the harness guide covers the first and second lateral side portions and the upper portion of the wiring harness and does not cover the lower portion of the wiring harness.

2. The electrical junction box as claimed in claim 1,
wherein at least the second end of the harness guide is inclined downward.

3. The electrical junction box as claimed in claim 2,
wherein a portion of the harness guide which does not cover the lower portion of the wiring harness at the second end of the harness guide is half or more of a whole length of the harness guide.

4. The electrical junction box as claimed in claim 1,
wherein a portion of the harness guide which does not cover the lower portion of the wiring harness at the second end of the harness guide is half or more of a whole length of the harness guide.

* * * * *